United States Patent
Trommer

(10) Patent No.: US 6,626,742 B2
(45) Date of Patent: Sep. 30, 2003

(54) POLISHING METHOD AND DEVICE

(75) Inventor: David Trommer, Kfar Vradim (IL)

(73) Assignee: MPM Ltd., Haifa (IL)

( * ) Notice: Subject to any disclaimer, the term of this patent is extended or adjusted under 35 U.S.C. 154(b) by 29 days.

(21) Appl. No.: 09/995,824

(22) Filed: Nov. 29, 2001

(65) Prior Publication Data

US 2002/0042244 A1 Apr. 11, 2002

Related U.S. Application Data

(63) Continuation-in-part of application No. 09/563,918, filed on May 4, 2000, now Pat. No. 6,332,829.

(51) Int. Cl.$^7$ ............................................. B24B 7/00
(52) U.S. Cl. .......................................... 451/41; 451/36
(58) Field of Search ..................... 451/28, 35, 36, 451/37, 41, 104, 106, 113; 216/88, 89, 90; 156/345.1, 345.11, 345.12

(56) References Cited

U.S. PATENT DOCUMENTS

| | | | |
|---|---|---|---|
| 5,353,839 A | 10/1994 | Kordonsky et al. ......... 137/806 |
| 5,404,680 A | 4/1995 | Mizuguchi et al. .......... 451/36 |
| 5,449,313 A | 9/1995 | Kardonsky et al. .......... 451/35 |
| 5,452,745 A | 9/1995 | Kordonsky et al. ......... 137/807 |
| 5,525,249 A | 6/1996 | Kordonsky et al. ...... 252/62.56 |
| 5,577,948 A | 11/1996 | Kardonsky et al. .......... 451/35 |
| 5,616,066 A | 4/1997 | Jacobs et al. ................. 451/36 |
| 5,795,212 A | 8/1998 | Jacobs et al. ................. 451/36 |
| 5,804,095 A | 9/1998 | Jacobs et al. ............ 252/62.52 |
| 5,810,126 A | 9/1998 | Kordonsky et al. ......... 188/267 |
| 5,839,944 A | 11/1998 | Jacobs et al. .................. 451/8 |
| 5,931,718 A | 8/1999 | Komanduri et al. .......... 451/36 |
| 6,106,380 A | 8/2000 | Jacobs et al. ............... 451/360 |
| 6,146,243 A | 11/2000 | Imahashi |
| 6,332,829 B1 | 12/2001 | Trommer ...................... 451/28 |
| 6,402,978 B1 * | 6/2002 | Levin ...................... 252/62.52 |
| 6,413,441 B1 * | 7/2002 | Levin ...................... 252/62.52 |
| 6,503,414 B1 * | 1/2003 | Kordonsky et al. ...... 252/62.52 |

FOREIGN PATENT DOCUMENTS

| | | |
|---|---|---|
| DE | 28 22 342 A1 | 12/1979 |
| SU | 841931 A | 6/1981 |

OTHER PUBLICATIONS

N. Umehara and K. Kato, "Fundamental Properties of Magnetic Fluid Grinding with a Floating Polisher", Journal of Magnetism and Magnetic Materials, Elsevier Science Publishers, Amsterdam, NL, vol. 122, NR. 1/3, pp. 428–431, XP000362591, ISSN: 0304–8853.

U.S. patent application Ser. No. 09/563,917, Trommer, filed May 4, 2000.

* cited by examiner

*Primary Examiner*—Lee D. Wilson
*Assistant Examiner*—David B. Thomas
(74) *Attorney, Agent, or Firm*—Eitan, Pearl, Latzer & Cohen Zedek, LLP

(57) ABSTRACT

A polishing system comprising one or more magnetic units able to produce a magnetic field is provided. The magnetic units may cause a polishing material to become plasticized and the plasticized material is able to polish a surface of a work piece. The polishing material may intermittently and repeatedly contact with the surface for polishing. A method for engraving or embossing a predefined pattern in a surface during magneto-rheological polishing of the surface is also provided.

21 Claims, 8 Drawing Sheets

POLISHING METHOD AND DEVICE

CROSS-REFERENCE TO RELATED APPLICATIONS

The present Application is a continuation-in-part application of patent application Ser. No. 09/563,918, filed May 4, 2000, now U.S. Pat. No. 6,332,829.

BACKGROUND OF THE INVENTION

There exist, known in the art, systems for polishing optical lenses. Some of these systems utilize a magnetorheological polishing substance known as a polishing slurry. Typically, the slurry is a mixture of magnetorheological compound, abrasive particles, and stabilizers.

When not acted upon by magnetic forces, the slurry is commonly in a liquid state. However, once acted upon by such a force, the slurry becomes much more viscous, pushing the abrasive particles to the surface of the liquid. This more viscous slurry, with the abrasives protruding from the surface, is then utilized as a polishing tool for abrading and polishing a work piece surface. Kardonsky et al. in U.S. Pat. Nos. 5,577,948 and 5,449,313 describes such a system.

In order for the magnetorheological-polishing device to be most efficient when being used as a polishing tool, it should be hard enough to apply sufficient force to press firmly the abrasive particles to the surface of the work piece. The polishing devices utilized in prior art systems acquire viscous, almost plasticized, properties known as Bingham properties, under the influence of magnetic forces. At this point, the device is hard enough to be used as a polishing tool. However, prior art devices reach this fully developed Bingham state only once, at the onset of the polishing movement.

Thereafter, once the movement of the work piece relative to the slurry commences, the slurry no longer sustains the Bingham properties, and the slurry loses the plasticized properties. Hence, although they become more viscous, they ultimately remain in the liquid state. Thus, frequently the liquid does not have sufficient force to push the submerged abrasive particles firmly against the polishing surface and, consequently, the abrasives do not efficiently abrade the work piece.

Additionally, polishing of the work piece is carried out in stages. At any given time a small surface area is polished. This area is defined by the size of a zone, known as the polishing zone, which is small relative to the size of the work piece. Thus the work piece is polished zone by zone. This approach hinders the achievement of uniform polishing across the entire surface of the work piece. Non-uniform work pieces, such as silicon wafers, present a potential problem in devices such as semi-conductors.

An additional problem is the non-uniformity of the magnetic field, which affects the affectivity of the polishing zone. The magnetic field on the magnet's edge is almost an order of magnitude higher than that at the center of the magnet. Therefore, the visco-plastic properties of the slurry in the polishing zone are non-uniform, contributing to non-uniform polishing of the surface.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanying drawings in which:

Figure 1:
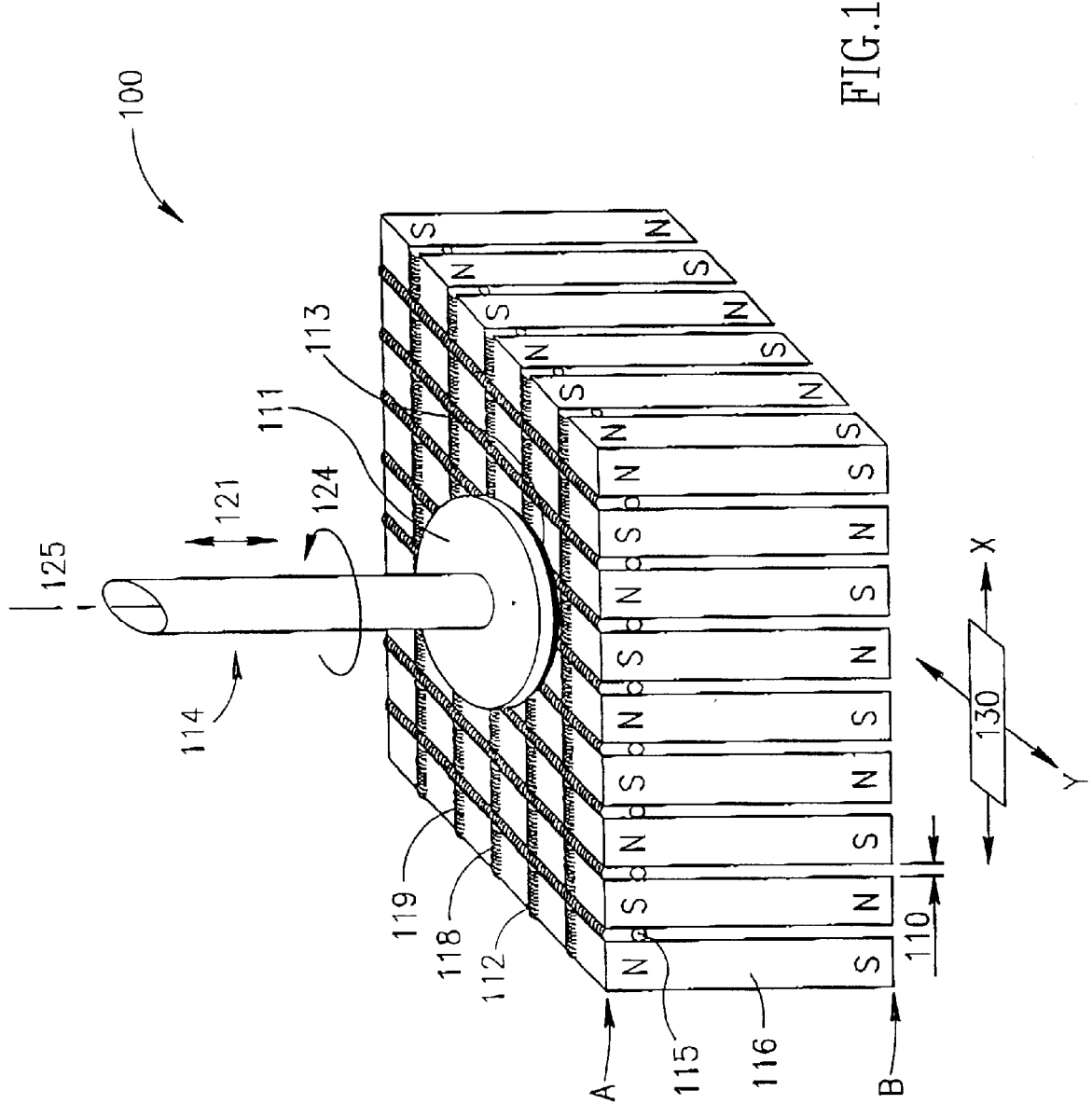
FIG. 1 is a schematic illustration of a polishing system according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Some embodiments of the present invention utilize magnetic polishing fluids (MPF) in a novel polishing system. These embodiments exploit the firmness and flexibility provided by the combination of magnetorheological suspensions (MRS) with ferrofluids (FF) and abrasive powders as well as chemical etchants, stabilizers, pH control agents and other additives in order to provide a more efficient, improved polishing device.

Reference is now made to FIG. 1, which depicts a system 100 for polishing of planar surfaces such as silicon wafers for ultra-large scale integration (ULSI), constructed and operative in accordance with some embodiments of the present invention.

System 100 may polish the surface of a work piece 113 via a series of intermittent impacts from plasticized quasisolid Magnetic Polishing Fluid (MPF) 112. MPF 112, under the influence of magnetic forces, acquires Bingham properties, and thus operates in the plasticized region, rather than in the liquid (Newtonian) region as is done in prior art. It is noted that the texture acquired by the MPF 112 in the plasticized region is stiffer than that acquired in the liquid region, and hence, when plasticized, MPF 112 is more effective as a polishing tool. In some instances work, piece 113 may be planar, curved or etched.

Some embodiments of the present invention provide a higher rate of removal of fragments from the surface of the work piece 113, and hence system 100 may provide a faster polishing system than known systems. Furthermore, in contrast to systems that induce point magnetization, and thus require extensive repeated cycling in order to sweep polish the entire work piece, some embodiments of the present invention teach full planar magnetization. Therefore, in some embodiments, system 100 sweep polishes the work piece in one cycle. The number of cycles is governed by the type and thickness of the material to be removed, regardless of the size of the area to be polished, thus ensuring better surface uniformity, System 100 may comprise a matrix of permanent magnetic dipoles 116, grouped in a predetermined pattern so as to create a smooth flat surface A, and an opposing surface B. The area of surface A may be greater than the projected area of the work piece 113. The flatness of surface A may be achieved by assembly techniques and/or post assembly surface machining and lapping. The size of the matrix may be 1000×400 mm for current size silicon wafers on the market.

The faces of the magnets 116, as they form surface A, may be arranged in alternating directions, i.e. adjacent magnets 116 are of opposite polarity: North, South, North, South, etc. The size of each magnet 116 may be 20*20 mm, and the gap between them, designated 110, may be up to 5 mm, for example, 0.1–0.5 mm. The magnets 116 provide a magnetic field 118, which acts upon MPF 112.

A soft iron shuttle 130 may slide across surface B. Shuttle 130 may be of a minimal width equal to the width of the gap 110 plus twice the thickness of a single magnet 116. The length of shuttle 130 may be equal to the longest dimension of surface B. The iron shuttle 130 slides over surface B, shorting or connecting the adjacent poles 116 as appropriate. The series of shorts or connections causes a change in the strength and geometry of magnetic field 118. Iron shuttle 130 may move along either the x or the y axis, in a combination of both directions, and, alternatively in a rotary motion as well. The rate of change in the properties of magnetic field 118 is proportional to the translation velocity of shuttle 130.

The MPF 112 is deposited so as to cover the top of surface A. Due to the magnetic field 118, the MPF 112 may acquire some specific mechanical properties. As dictated by the geometry and arrangement of the magnetic field 118, MPF 112 takes on a crisscrossed shaped pattern of convex shapes.

MPF 112, such as described in U.S. application Ser. No. 09/563,917, may be a combination of magnetorheological substance (MRS), ferrofluid (FF), abrasives 119 and components for stabilization etch rate and pH control. Such a combination may acquire Bingham properties under the influence of an applied magnetic field 118.

The change in the strength of field 118 changes the state of MPF 112 from a Newtonian state to a Bingham state, or vice versa. When the MPF 112 is in the Bingham state, it forms a rigid porous matrix with the trapped abrasive particles 119 pushed to the surface.

The ferrofluid may be pushed up through the porous rheological media due to capillary forces and is concentrated in the shallows of the upper face of MPF 112, thus smoothing out and planarizing the abrasive surface. The ferrofluid displays rheological behavior under the influence of field gradients, albeit to a substantially lesser degree than the other rheological components of MPF 112. These gradients may push the abrasives toward the upper surface of the ferrofluid.

Planar work piece 113 may be held in a horizontal position by a rotatable holder (chuck) 114 having a holding plate 111. Holding plate 111 may have a planar or a concave surface. Holder 114 may rotate around axis 125 in a plane parallel to surface A, as illustrated by arrow 124. Holder 114, which is also capable of vertical movement 121 may lower work piece 113 onto the surface of MPF 112, bringing work piece 113 into contact with abrasive particles 119.

Particles 119, being held at the surface of MPF 112 by the application of magnetic field 118 thereto, impact with work piece 113, shaving off a fragment of the work piece. The distance between the surface of MPF 112 and work piece 113, is adjustable by coaxial movement of axis 121. Thus the work piece may be submerged in MPF 112 or may just touch its surface, achieving different levels of polishing parameters.

When the work piece 113 contacts MPF 112, the MPF loses its Bingham properties and liquidizes. However, due to the movement of the iron shuttle 130, described above, magnets 116 are intermittently shorted and magnetic field 118 is intermittently reapplied. Thus, with each reapplication of magnetic field 118, MPF 112 re-plasticizes and re-impacts with work piece 113, causing repeated intermittent shaving of the planar surface of the work piece 113.

The physical explanation of this phenomenon is as follows: When magnetic field 118 is applied to MPF 112, the MPF 112 acquires the properties of a plasticized solid whose yield point depends on the intensity of field 118. In this plasticized state, abrasive particles 119 are effectively held on the surface of the MPF 112. However, upon impact with the work piece 113, the shear stress of the MPF 112 exceeds the yield point, and the MPF 112 liquidizes. At this point, the abrasives 119 are suspended in a liquid matrix, in a Newtonian-like fluid.

Therefore, in order to provide an effective polishing process, MPF 112 may be prevented from permanently crossing the yield point into the liquid state. Thus, some embodiments of the present invention teach repeated application of the magnetic field 118. Hence, once the plasticized Bingham state of the MPF collapses, magnetic field 118 is reapplied, and the Bingham properties are recovered, allowing the MPF 112 to regain the plasticized properties. The MPF 112 hence acquires rigid properties and the polishing process is similar to a succession of impacts of a rigid tool on the surface of the work piece 113.

It is noted that the constant renewal of the magnetic field 118, as taught herein, operates in contrast to the methods of continuous magnetic field application known in the art. In known methods, MPF 112 acquires plasticized properties at the commencement of the polishing cycle only, and upon the first impact with the work piece 113 reverts to a liquid state and remains therein. Therefore, the polishing process is a continuous massage in which the abrasives 119 are continuously submerged in a semi-liquid state.

As needed to compensate for projected losses of MPF 112, an array of tubes 115 supplies the MPF 112, abrasive materials 119 and chemicals to surface A. Additionally, the supply tubes 115 may also carry chemicals to control polishing parameters (e.g. removal rate, surface passivation, etc.).

In alternative embodiments of the present invention (not shown), the direction of the magnetic dipoles 116 is unified, for example, the polarity on the side facing surface A is north only. Thus, the magnetic field gradients are stronger and the shaving/polishing force of the ferrofluidic components of the MPF 112 upon the working piece 113 is greater. Also, the force of the main rheological component is lower. There are materials that may benefit from such a polishing regime.

The iron shuttle 130 may also be of varying cross sections, and the distance between shuttle 113 and plane B may also vary. Alternatively, the shuttle 130 may be a grid of paramagnetic material pieces of a shape and arrangement similar to that of the dipoles 116.

Holder 114 may comprise ferromagnetic and/or paramagnetic materials for enhancing the magnetic field intensity so as to increase the removal rate of fragments from the exposed surface of work piece 113. For example, holding plate 111 may be a carbon-steel plate. Holder 114 may be constructed so as to comprise permanent magnetic poles or electromagnets which may be positioned within holding plate 111 or alternatively above holding plate 111. The magnets may be placed in alternating or consecutive directions as explained hereinabove with respect to magnets 116.

Figure 8A:
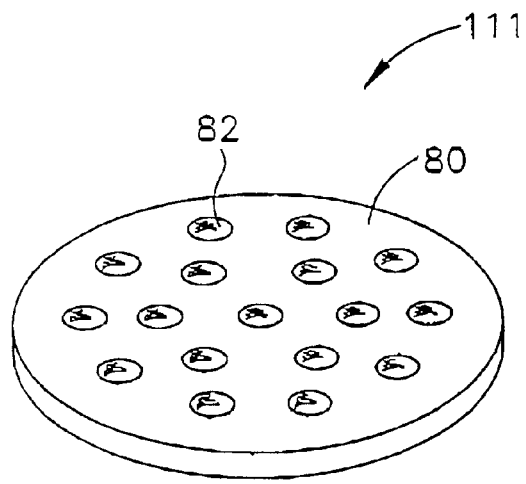
FIG. 8A is a schematic illustration of a holding plate according to some embodiments of the present invention.
Figure 8B:
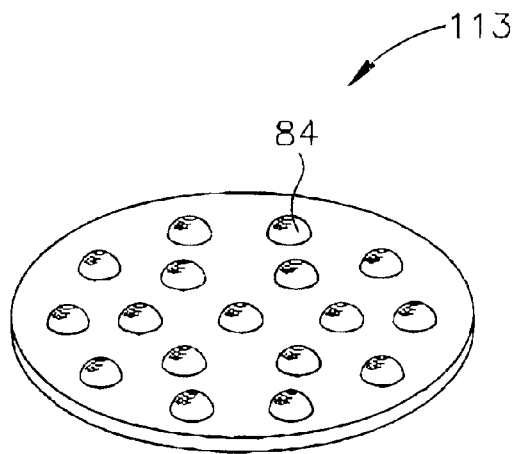
FIG. 8B is a schematic illustration of a work piece according to some embodiments of the present invention.
Figure 8C:
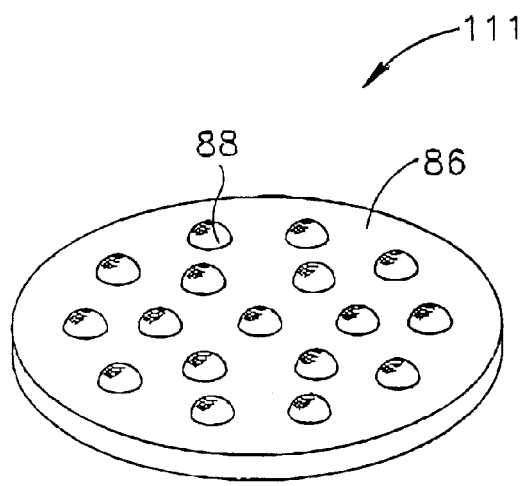
FIG. 8C is a schematic illustration of a holding plate according to some embodiments of the present invention.
Figure 8D:
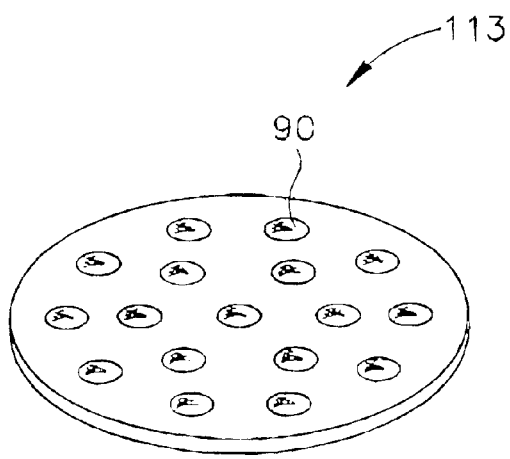
FIG. 8D is a schematic illustration of a work piece according to some embodiments of the present invention.

Reference is now made to FIGS. 8A–8D. FIGS. 8A and 8C show an exploded view of a holding plate according to some embodiments of the present invention. FIGS. 8B and 8D show an exploded view of a work piece according to some embodiments of the present invention. Holding plate 111 may comprise a surface 80 connectable to work piece 113. Surface 80 may have a predetermined etched pattern 82 as shown in FIG. 8A. During polishing, surface 80 may abut work piece 113 and a matching embossed pattern 84 may be created on the polished surface of work piece 113, as shown in FIG. 8B.

Alternatively, holding plate 111 may comprise a surface 86 having a predetermined embossed pattern 88 as shown in FIG. 8C. In such a case, during polishing a matching engraved pattern 90 may be created on the polished surface of work piece 113, as shown in FIG. 8D.

In some embodiments according to the present invention, holding plate 111 may comprise a surface having a predetermined inlaid pattern. When the magnetic permeability of the inlaid material is higher than the magnetic permeability of the rest of the surface, a matching engraved pattern is created onto the exposed surface of work piece 113 during polishing. When the magnetic permeability of the inlaid material is lower than the magnetic permeability of the rest of the surface, a matching embossed pattern is created onto the exposed surface of work piece 113 during polishing.

The physical explanation of this phenomenon is as follows: In areas having a lower magnetic permeability, such as engraved areas 82, the local magnetic field intensity is lower than the local magnetic field intensity of the surface around. Consequently, fewer abrasive particles of MPE 112 are pushed upwards in the areas vertically below the engraved areas 82 and the MPF becomes softer. Therefore, less material may be removed from work piece 113 during polishing, thus creating an embossed pattern.

In areas having a higher magnetic permeability, such as embossed areas 88, the local magnetic field intensity is higher than the local magnetic field intensity of the surface around. Consequently, more abrasive particles of MPF 112 are pushed upwards in the areas vertically below the engraved areas 82 and the MPF becomes harder. Therefore, more material may be removed from work piece 113 during polishing, thus creating an engraved pattern.

Figure 2:
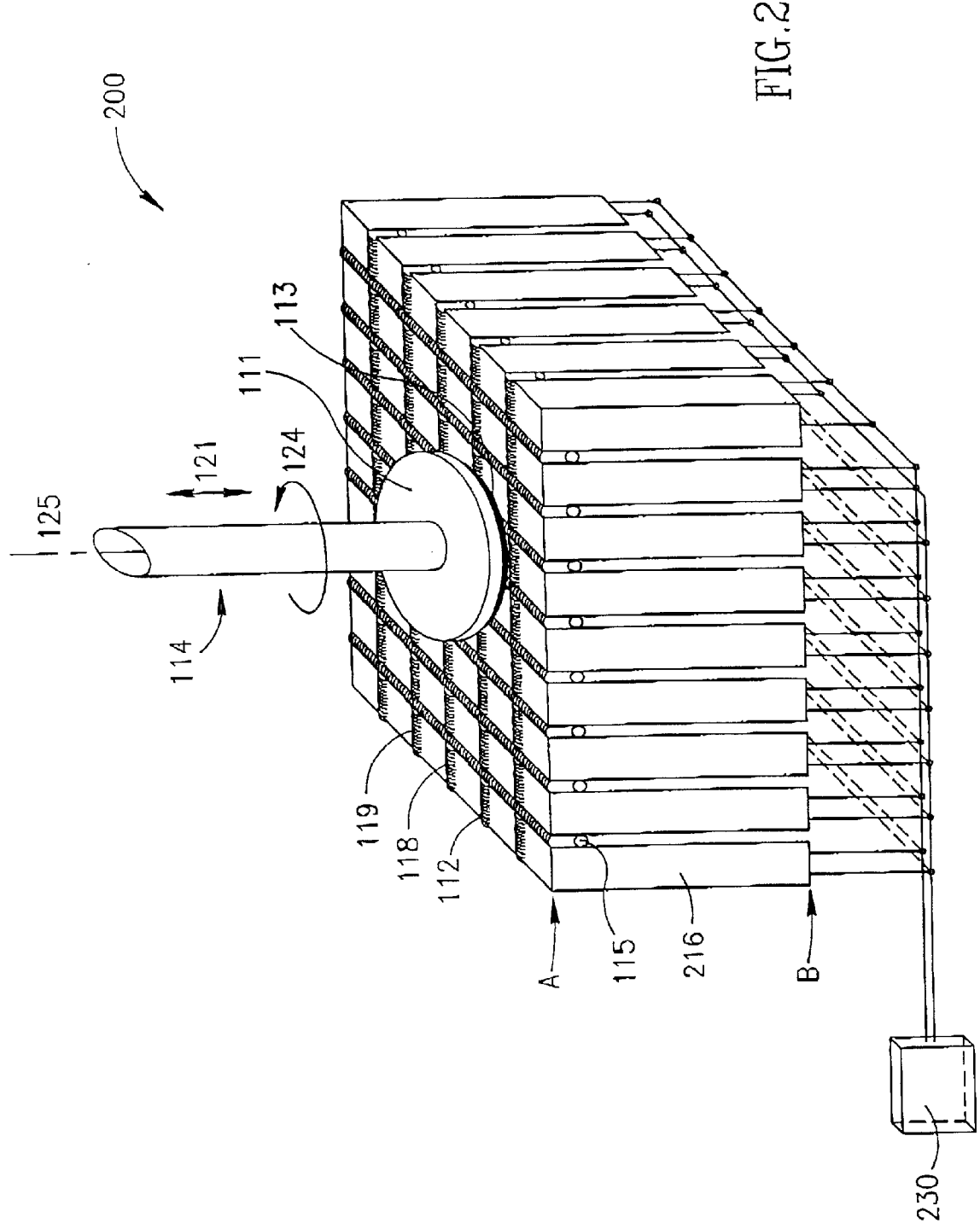
FIG. 2 is a schematic illustration of some alternative embodiments of the polishing system illustrated in FIG. 1.

Reference is now made to FIG. 2, an illustration of a polishing system 200 according to some embodiments of the present invention. Elements similar to those depicted in FIG. 1 are similarly referenced and will not be further described.

Similar to system 100, wherein the magnetic force 118 is supplied by the magnets 116, in system 200 the force may be supplied by a matrix of electro-magnets 216. A pulse generation unit 230 may supply intermittent current to the electro-magnets 216. The pulse train sequence, duty cycle, amplitude and polarity are controllable. The current may be pulsed between any two values, preferably between a small "holding current" value of ~0.2 A and a peak value. A pulse of current to any of the magnets 116 creates a pulse in magnetic field 118 that in turn, and as described hereinabove, transfers the MPF 112 from the liquid state to the Bingham state.

The ferromagnetic components of the MPF 112 may be injected during the "off" portions of the pulse trains via tubes 115, as described above.

In order to compensate for heat radiation as a result of copper losses, the matrix of electromagnets 216 is immersed in a liquid coolant, a transformer oil for example, (not shown) that "pumps out" the heat mainly via a heat exchanger (not shown).

In these embodiments, and in contrast to system 100, the direction of the magnetic dipoles 116 is not fixed and, therefore a polarity field of either unified or alternating directional pattern is obtainable via the controllable pulse generation unit 230. This permits either a strong magnetic field that enhances the polishing force, or a weak magnetic field that will allow a more precise utilization of the polishing process or both simultaneously in different locations.

In both the embodiments described in reference to FIGS. 1 and 2, a reciprocal movement of plane A is also possible in addition to or instead of the movement of work plane 113.

Figure 3:
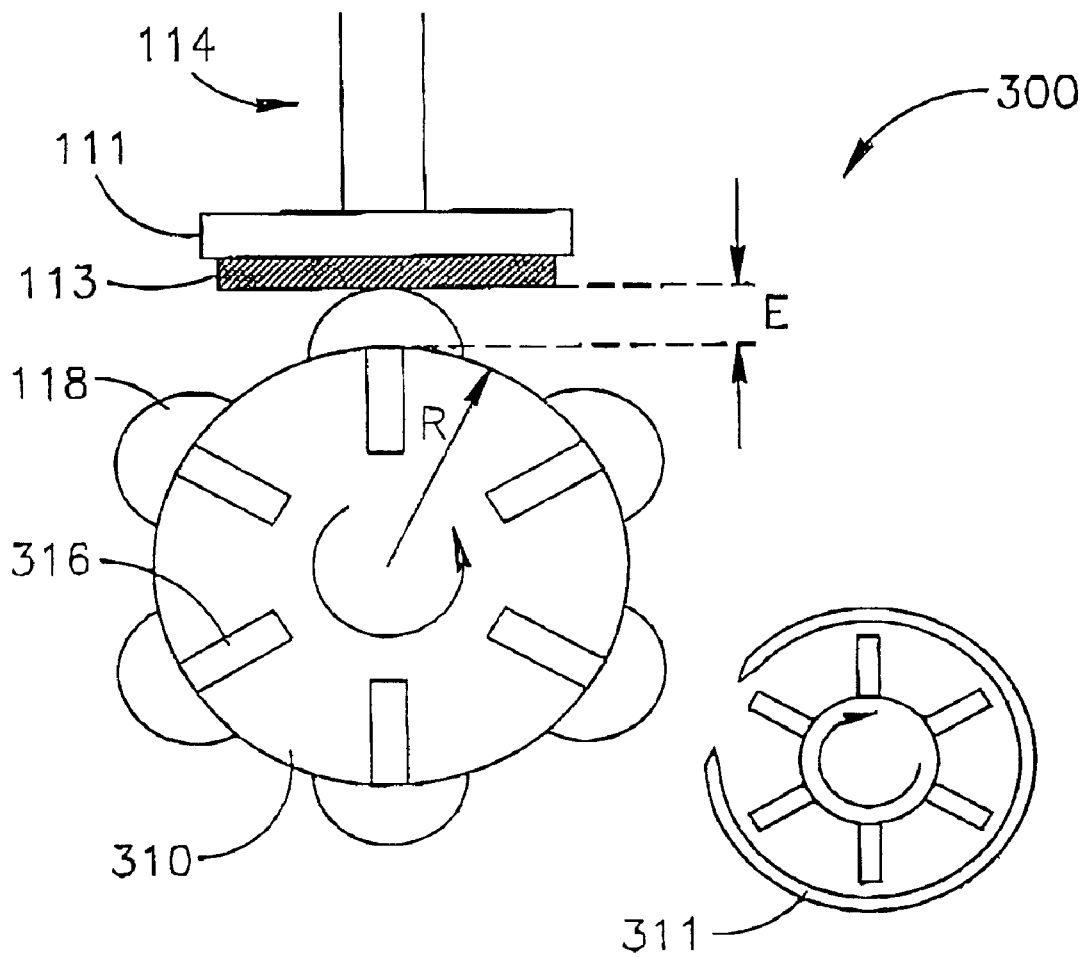
FIG. 3 is a side view of a polishing system according to some embodiments of the present invention.

Reference is now made to FIG. 3, an illustration of polishing system 300 according to some embodiments of the present invention. Elements similar to those depicted in previous figures are similarly referenced and will not be further described.

System 300 may comprise a cylinder 310 with several long magnets 316 imbedded along the outside circumference of cylinder 310. Cylinder 310 is preferably of radius R, rotates along its longitudinal axis, and is longer than the working dimension of the work piece 113.

Magnets 316 are flush with the outside surface of cylinder 310 or, alternatively, protrude from the surface of cylinder 310. Additionally, magnets 316 are magnetized in the direction of the radii and are arranged for identical poles to face outward or, alternatively, for alternating poles to face outward.

Cylinder 310 is lowered horizontally into a vessel (not shown) such that cylinder 310 contacts MPF 112. Cylinder 310 is placed adjacent to a trimming device (trimmer) 311 by mechanical means that provide for their relative controllable position. The trimmer 311 controls the MPF thickness on the magnetic poles by cutting off excesses and replenishing depleted quantities. Rotating chunk 114 holds work piece 113 at a distance E above the surface of cylinder 310.

Magnets 316 produce magnetic field 118, which acts upon MFP 112, shaping and solidifying MFP 112 into a plasticized system of periodic ridges and valleys. The ridges are higher than distance E. The plasticization of MPF 112 pushes abrasive particles to the outer circumference of MPF 112, covering the ridges as well as the valleys.

Cylinder 310 rotates relative to work piece 113, causing the semi-solid ridges of MPF 112, along with abrasive particles covered thereto, to periodically impact the surface of work piece 113. With each impact, chips of work piece 113 are shaved off, thereby performing an act of abrasion. The removal rate of material from the work piece 113 can be controlled by controlling the speed of rotation and the distance E for given properties of MPF 112 and magnets 316.

It is noted that each time semi-solid MPF 112 impacts the surface of work piece 113, MPF 112 liquidizes. However, generally, immediately following impact, the stress is removed due to loss of contact, and MPF 112 replasticizes, preparing for another impact with work piece 113.

Figure 4A:
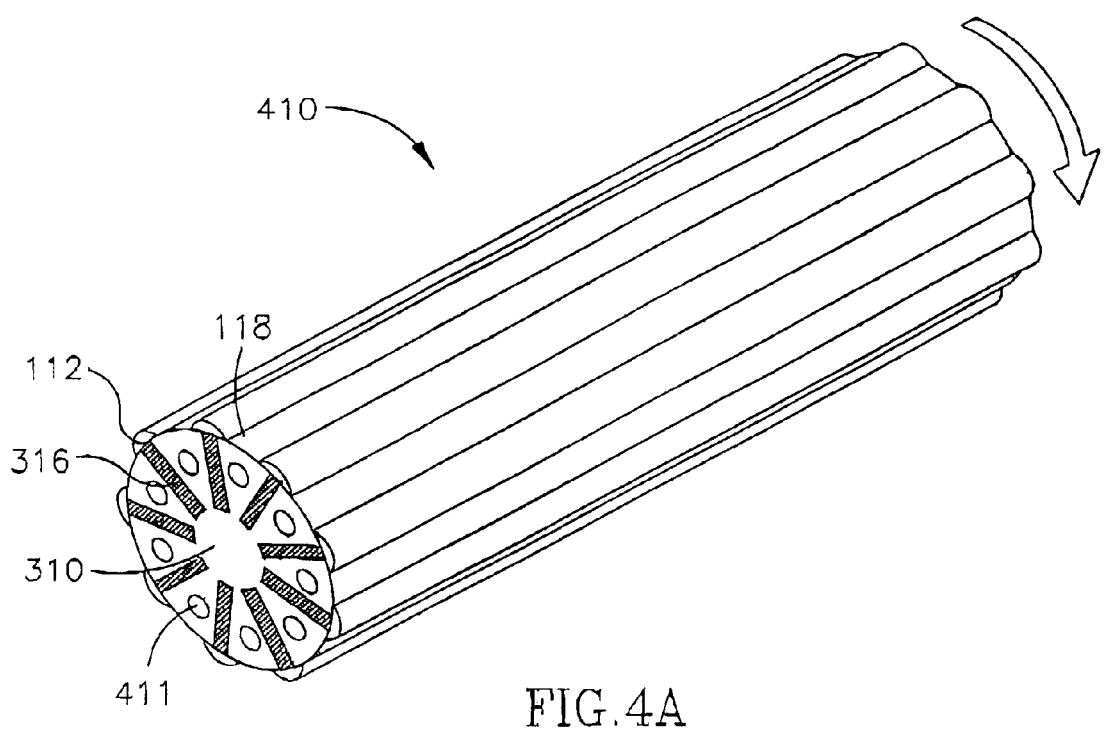
FIG. 4A is a schematic illustration of some alternative embodiments of the polishing system illustrated in FIG. 3.
Figure 4B:
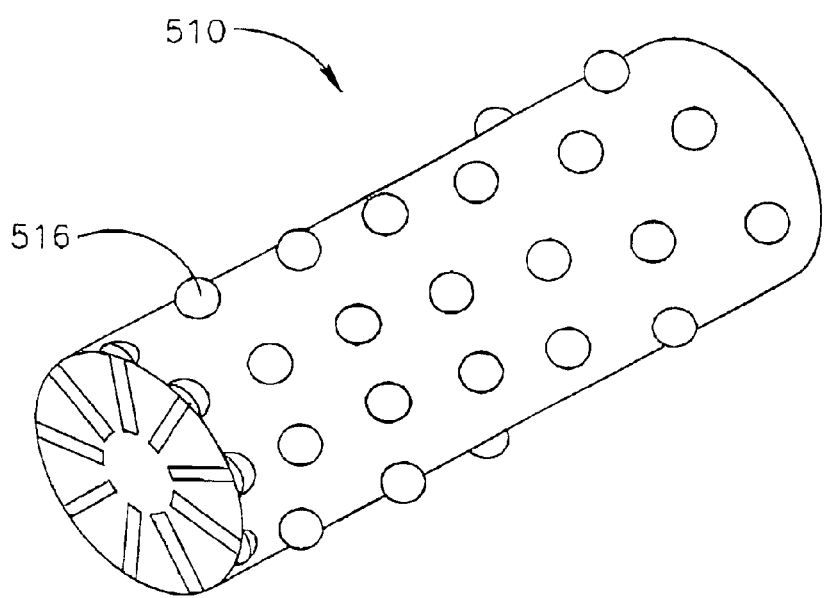
FIG. 4B is a detailed illustration of a portion of the system illustrated in FIG. 4A.

Reference is now made to FIGS. 4A and 4B, which illustrate alternative cylinders 410 and 510, which are usable in polishing system 300. Elements similar to those depicted in previous figures are similarly referenced and will not be further described.

Cylinder 410 comprises an array of tubes 411 positioned between the dipoles 316. Tubes 411 contain a supply of MPF 112, which secretes therefrom onto the outer surface of the cylinder as needed. Alternatively, tubes 411 may also contain a supply of chemical and abrasive components.

Cylinder 510 comprises magnet dipoles 516 positioned along the longitudinal axis of cylinder 510. The magnet dipoles 516 are in a spiral pattern. Additionally, the magnets may also be protruding from the cylinder's surface.

In an alternative cylinder (not shown) each dipole 316 may comprise a cluster of thin, long magnets in an alternating-poles arrangement. These poles of combined magnets may be grouped in a cassette that is inserted into the cylinder as an interchangeable unit. Alternatively, the cylinder surface (including the magnetic poles) is covered by a wire mesh of fine gauge wire 0.1 mm to 0.5 mm thick, or a thin laminated metal-wool blanket preferably 0.5 mm to 1 mm thick (not shown). The wire mesh or metal-wool blanket may be made of ferromagnetic materials. Additionally, the cylinder surface may be covered with mesh-wise, laminated, or porous non-metal materials. It is to be noted, that the cylinder outer surface may be shaped or profiled.

Figure 5:
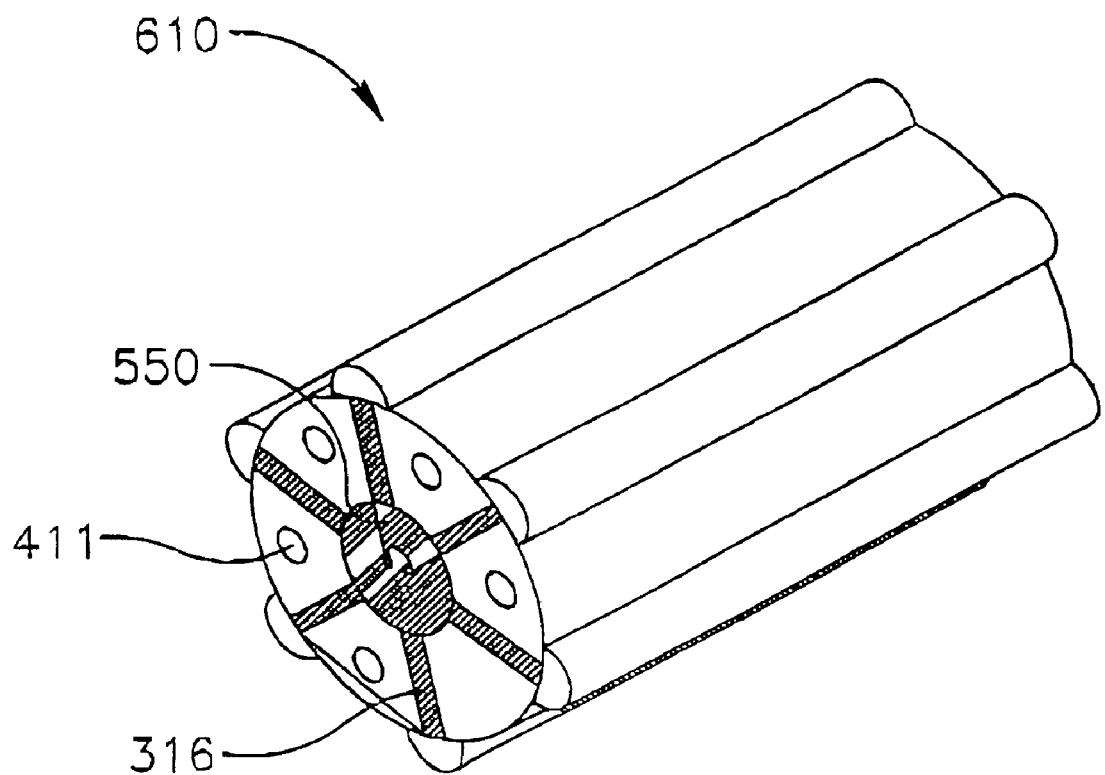
FIG. 5 is a schematic illustration of some embodiments of the polishing system illustrated in FIG. 3.

Reference is now briefly made to FIG. 5, which illustrates an alternative cylinder 610, operated and constructed according to some embodiments of the present invention. Elements similar to those depicted in previous figures are similarly referenced and will not be further described.

Cylinder 610 may comprise ferro-magnetic mandrel 550, inserted co-axially into the center of cylinder 610. The outside diameter of mandrel 550 contacts the imbedded poles of magnets 316. Magnets 316 pass above the ferromagnetic portions of the mandrel 550, causing a change in magnetic field strength thereto and enhancing the magnetorheological phenomena in applicable locations.

Figure 6:
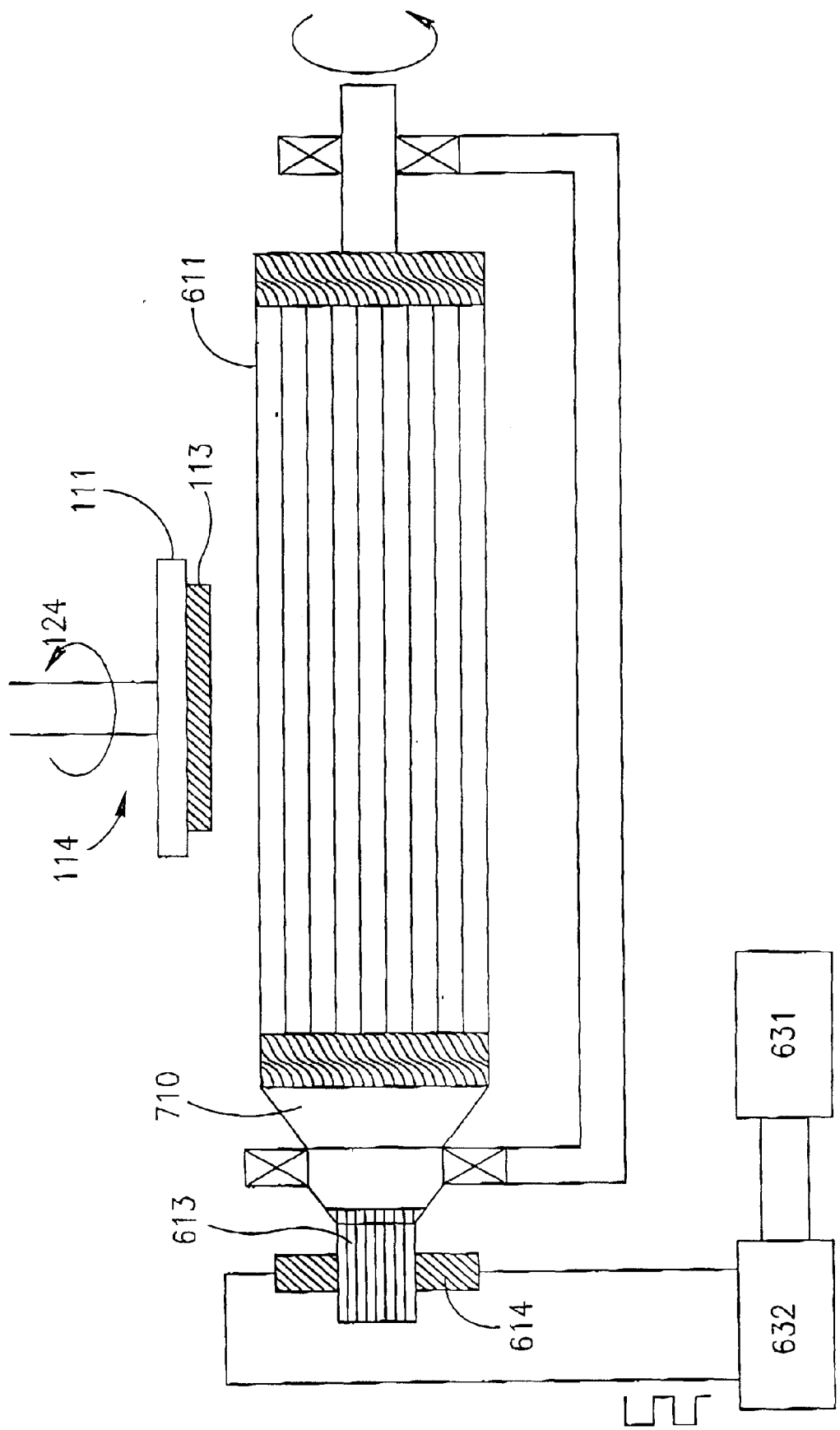
FIG. 6 is a schematic illustration of some embodiments of the polishing system illustrated in FIG. 3.

Reference is now made to FIG. 6, which illustrates yet another cylinder according to some embodiments of the present invention. Elements similar to those depicted in previous figures are similarly referenced and will not be further described.

Polishing cylinder 710 may comprise an array of electromagnets 611, very similar to a rotor of an electric direct current (DC) motor.

An electric current is supplied through a rotor 613 by brushes 614 or, preferably, by a brushless arrangement such as in a car's alternator. A power source unit 631 supplies a current to the rotor 613 through a current control unit 632 that chooses the electromagnets to be supplied, the sequence, the amplitudes and polarity.

This arrangement allows control of polishing forces, i.e., the direction of the magnetic dipoles 611, and, therefore, permits, as explained hereinabove in reference to FIG. 2, either a strong magnetic field that enhances the polishing force or a weak magnetic field that allows a more precise utilization of the polishing process.

This arrangement may also provide enhanced magnetic phenomena in MPF 112 in applicable locations and concurrently provides for removal of MPF 112 from other locations for recycling, cleaning or remixing. Frequently, there is a need to remove MPF 112 in order to exchange the MPF for a different type of fluid more suited for the task, in order to clean the poles and cylinders for maintenance, or for other reasons. It is also sometimes desirable to change the chemical/physical properties of the MPF 112 by remixing in a mixer with different additives and reapplying to the cylinder. The removal is difficult due to acting magnetizing forces. The electrical coils may be switched off, thus eliminating the magnetic pulling forces on the MPF and the latter may be easily removed. This advantage does not exist with permanent magnets.

Figure 7A:
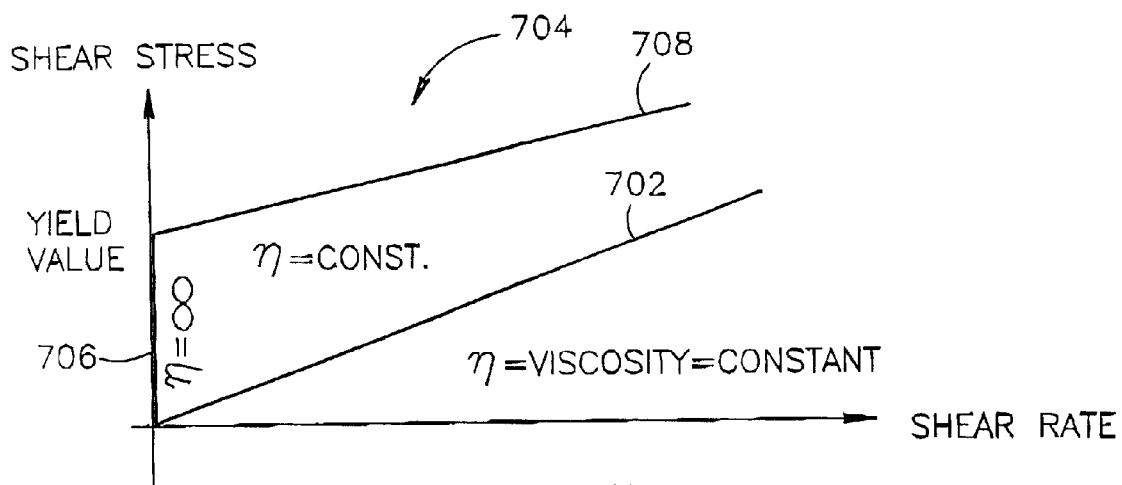
FIG. 7A is a characteristic diagram of viscosity profiles for two rheological fluids: a Newtonian and an idealized Bingham.

Reference is now made to FIG. 7A, a characteristic diagram of viscosity profiles for two fluids: a non-rheological one, with a Newtonian profile, and a rheological one with a Bingham profile. The mathematical models describing the two fluids are as follows:

Newtonian: $\tau = \eta \times \delta$

Bingham Plastic: $\tau = \eta_p \times \delta + \tau_y$

Where, $\tau$=Shear stress $\tau_y$=Static yield value of shear stress $\delta$=Shear rate $\eta$=Constant coefficient of viscosity $\eta_p$=Coefficient of viscosity beyond yield point It is noted that shear stress is the force required to move unit areas of fluid and sustain unit flow. Shear stress is measured in $N/m^2$ units. Shear rate is the velocity of a fluid's movement in a given plane relative to a reference plane, divided by the distance between them. The units for shear rate are (m/sec)/m or $SEC^{-1}$. Viscosity is the ratio of shear stress to shear rate. Consequently, the units are $(N \times sec)/m^2$, or Poise (dyne-sec/centimeter) in CGS units.

For most fluids, viscosity is not a constant but varies with shear rate. Such fluids are rate dependent. In a few systems, shear rate and shear stress are in direct proportion. Such fluids have a constant viscosity and are termed Newtonian fluids. Water and oils are typical examples of the latter.

Some fluids have a certain critical shear stress that must be exceeded before flow can begin. This critical shear stress is called "yield value". If, after crossing yield value, the fluid exhibits Newtonian flow characteristics, the fluid is called a "Bingham Plastic Fluid".

When considering the above definitions, viscosity (as depicted in FIG. 7A) is represented by the angle of inclination of the curves. The Newtonian curve, designated as 702, is a straight line and, therefore, maintains a constant viscosity for all temperatures and pressures.

The idealized Bingham plastic fluid curve, designated as 704, is constructed of two successive parts: a vertical line (designated as 706) from the axis origin up the shear stress axis to the yield value, and a diagonal line (designated as 708) that resembles the Newtonian curve 702.

The vertical part 706 represents an infinitely high viscosity value of the fluid, or a solid like state of matter. Applying force and crossing the yield value causes a drastic drop in viscosity, (diagonal part 708) down to the region of Newtonian fluids. In a polishing process using MPF, it is very desirable to stay in the region of infinite viscosity (vertical part 706) as much as possible, as it ensures very high removal rates and uniformity.

The shear rate caused by the polishing process transfers the Bingham fluid into the low viscosity region (part 708). In the invention, once this happens, the part of fluid that underwent this transition is prevented from being exposed to the shear rate of polishing, either by removing the magnetic field acting upon it, or by removing the fluid temporarily from the polishing process. Then, due to the restoration of the magnetic field, the fluid regains its very high viscosity and is applied anew to the polishing process.

Figure 7B:
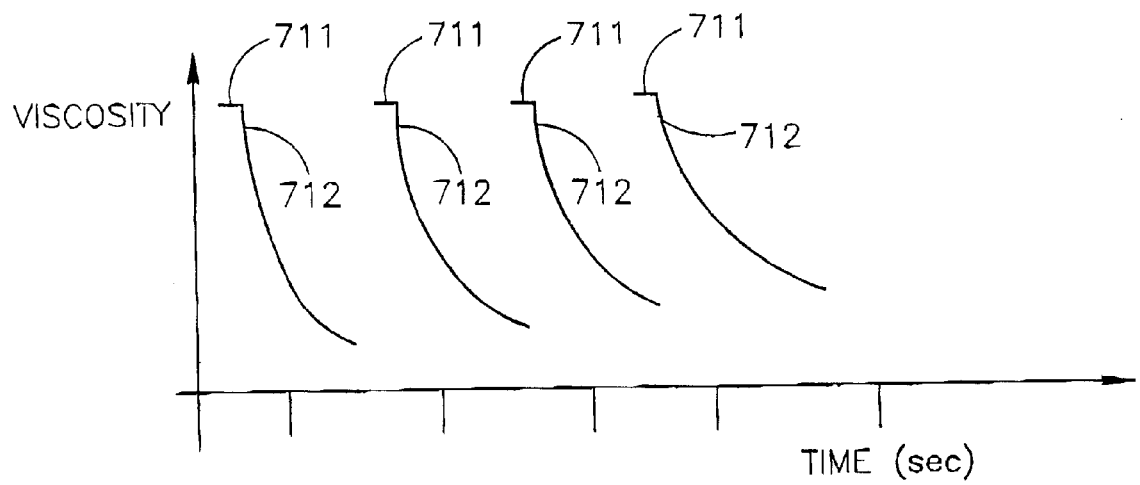
FIG. 7B is a characteristic diagram of the apparent viscosity of Bingham magnetic polishing fluid in the process of the present invention.

The apparent viscosity of Bingham magnetic polishing fluid in the process is represented in FIG. 7B. It is noted that each time the viscosity is high, points 711, the magnetic field is re-applied or shear stress is removed, and each time the shear stress has crossed the yield value, points 712, the viscosity drops.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A polishing system comprising:
    a polishing material;
    one or more magnetic units to produce a magnetic field to cause said polishing material to become plasticized, wherein said plasticized material is able to polish a surface of a work piece, said polishing material is in intermittent, repeated contact with said surface; and
    a holder having a holding plate able to hold another surface of said work piece.

2. The system of claim 1, wherein said holder comprises a ferromagnetic material.

3. The system of claim 1, wherein said holder comprises a paramagnetic material.

4. The system according to claim 1, wherein one or more magnets are positioned within said holding plate.

5. The system of claim 4, wherein said magnets are placed in alternating directions.

6. The system of claim 1, further comprising one or more magnets positioned above said holding plate.

7. The system of claim 6, wherein said magnets are placed in alternating directions.

8. The system of claim 1, wherein a surface of said holding plate comprises a predetermined etched pattern so that during polishing a matching embossed pattern is created onto said surface of said work piece.

9. The system of claim 1, wherein a surface of said holding plate comprises a predetermined embossed pattern so that during polishing a matching engraved pattern is created onto said surface of said work piece.

10. The system of claim 1, wherein a surface of said holding plate comprises a predetermined inlaid pattern so that during polishing a matching pattern is created onto said surface of said work piece.

11. The system of claim 10, wherein said surface of said holding plate comprises a first material having a first magnetic permeability and said inlaid pattern comprises a second material having a second magnetic permeability.

12. The system of claim 11, wherein said second magnetic permeability is higher than said first magnetic permeability so that said matching pattern is an engraved pattern.

13. The system of claim 11, wherein said second magnetic permeability is lower than said first magnetic permeability so that said matching pattern is an embossed pattern.

14. The system of claim 1, and comprising means for intermittently magnetizing said one or more magnetic units.

15. The system of claim 1, wherein said work piece is a silicon wafer.

16. The system of claim 1, wherein said surface of said work piece is planar.

17. The system of claim 1, wherein said surface of said work piece is curved.

18. A method comprising:
    engraving a predefined pattern in a surface during magneto-rheological polishing of said surface.

19. A method comprising:
    embossing a predefined pattern in a surface during magneto-rheological polishing of said surface.

20. A method comprising:
    supplying an intermittent or alternating current through one or more electromagnets to create a magnetic field sufficient to plasticize a liquidized polishing material;
    polishing a surface of a work piece with said plasticized polishing material, thus liquidizing said plasticized polishing material: and
    repeating the operation of supplying.

21. A method comprising:
    moving a ferromagnetic shuttle below one or more magnets to create a magnetic field sufficient to plasticize a liquidized polishing material;
    polishing a surface of a work piece with said plasticized polishing material, thus liquidizing said plasticized polishing material; and
    repeating the operation of supplying.

* * * * *